Figure 1:
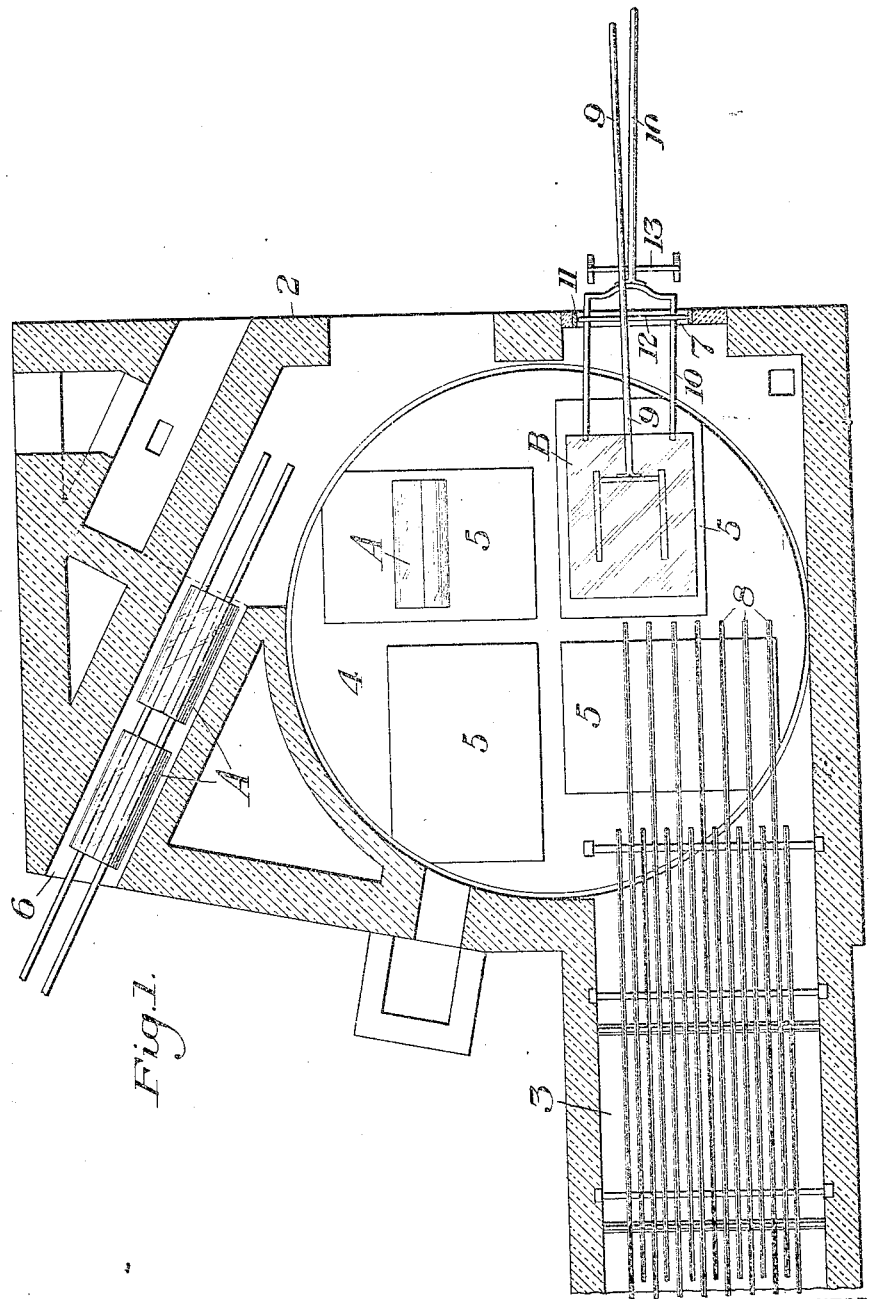

O. B. CARNAHAN.
METHOD OF HANDLING GLASS SHEETS.
APPLICATION FILED MAY 6, 1913.

1,125,468.

Patented Jan. 19, 1915.
2 SHEETS—SHEET 1.

WITNESSES
R. A. Balderson

INVENTOR
O. B. Carnahan

O. B. CARNAHAN.
METHOD OF HANDLING GLASS SHEETS.
APPLICATION FILED MAY 6, 1913.
1,125,468.
Patented Jan. 19, 1915.
2 SHEETS—SHEET 2.
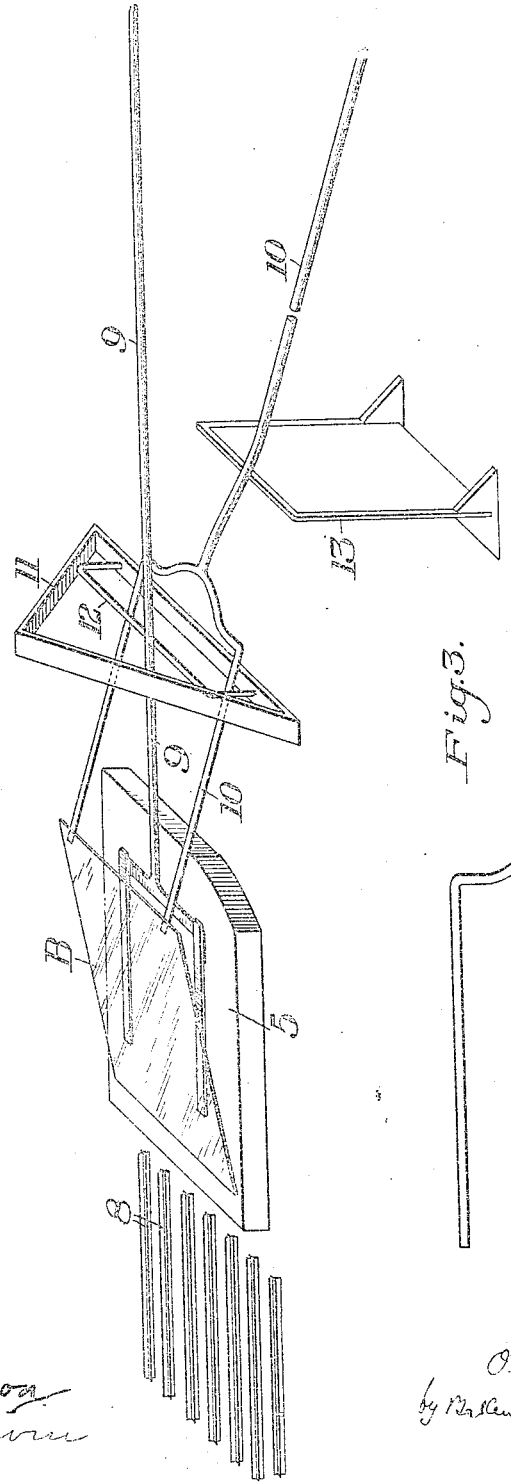
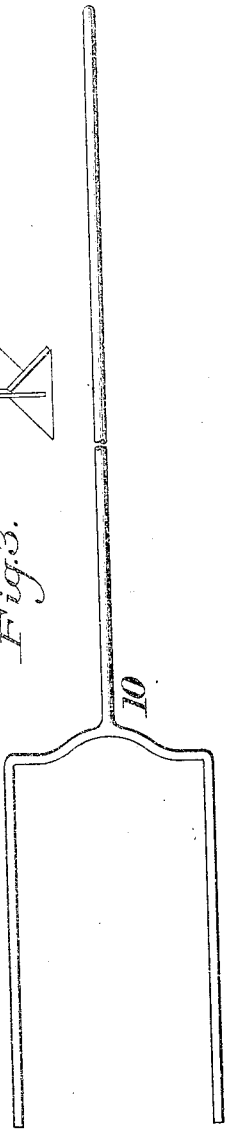

UNITED STATES PATENT OFFICE.

ORLANDO BARTON CARNAHAN, OF NEW EAGLE, PENNSYLVANIA, ASSIGNOR TO WINDOW GLASS MACHINE COMPANY, OF PITTSBURGH, PENNSYLVANIA, A CORPORATION OF NEW JERSEY.

METHOD OF HANDLING GLASS SHEETS.

1,125,468.  Specification of Letters Patent.  Patented Jan. 19, 1915.

Application filed May 6, 1913. Serial No. 765,795.

*To all whom it may concern:*

Be it known that I, ORLANDO B. CARNAHAN, a citizen of the United States, residing at New Eagle, Washington county, Pennsylvania, have invented a new and useful Improvement in Methods of Handling Glass Sheets, of which the following is a full, clear, and exact description, reference being had to the accompanying drawings, forming part of this specification, in which—

Figure 1 is a horizontal section of a portion of a glass flattening and annealing furnace showing my invention applied thereto; Fig. 2 is a perspective view illustrating the operation of my invention; and Fig. 3 is a plan view of the auxiliary piling fork.

My invention has relation to improvements in the manufacture of glass, and more particularly to a novel method of removing glass sheets from flattening tables or stones and transferring them to the lehr rods of a lehr.

In the manufacture of glass sheets, in which the glass is first drawn in cylinder form and the cylinders are then split and flattened into sheets, the work of flattening is done on a table within one end of a combined flattening and annealing furnace; and after the sheets have been flattened they are transferred to the lehr rods, by which they are carried through the annealing or lehr chamber of the furnace. Heretofore, considerable difficulty has been experienced in removing the flattened glass sheets from the flattening table. These sheets become more or less softened by the heat of the furnace and tend to adhere to the tables. This work is usually done by means of a fork, which is forced between the flattening stone and the sheet of glass and by which the sheet when it is loosened is transferred onto the lehr rods. Forks of this kind are known in the art as piling forks. The use of these forks in this manner has resulted in a very considerable loss of glass due to the difficulty of forcing forks underneath the glass sheets and the tendency to scratch or otherwise injure the glass during this operation. This has required the use of skilled labor for this purpose, and even with highly skilled labor a very considerable percentage of loss is inevitable.

My invention provides a method of simple and effective character whereby this difficulty is avoided and the percentage of loss is very largely reduced.

The nature of my invention will be best understood by reference to the accompanying drawing, in which I have shown a preferred embodiment thereof, and which will now be described.

In these drawings, the numeral 2 designates the flattening oven, and 3 a portion of the lehr chamber of a combined flattening and annealing furnace. 4 is the usual rotary table carrying a plurality of flattening stones 5. 6 designates an opening through which the glass cylinders A to be flattened are moved into the flattening chamber. 7 designates an opening opposite the rear end of the lehr chamber 3 and through which the workman manipulates the forks for transferring the flattened sheets (one of which is indicated at B) from the flattening stones to the lehr rods 8.

In accordance with my invention, in addition to the usual piling fork 9, having broad flat prongs adapted to pass underneath the glass sheet and support the same, I employ an auxiliary fork 10. This fork has relatively small sharp-ended prongs. I preferably build a frame 11 into the opening 7 and provide the bottom bar of this frame with a raised cross bar 12, which may be used as a fulcrum for the fork 9.

The method of operation is as follows:— The operator first introduces the extreme ends of the prongs of the auxiliary fork 10 underneath the edge of the sheet. This can be readily done as the points of the prongs are relatively small and sharp. By a prying action he then raises the sheet to a position substantially such as that shown in Fig. 2, and then permits the handle of the fork 10 to rest on a suitable support 13. Preferably the weight of the handle of this auxiliary fork is such that when it is lowered onto this rest in the manner shown in Fig. 2, it will overcome the weight of the sheet and will leave the hands of the operator free to operate the main fork 9. The auxiliary fork is operated underneath the cross bar 12. The main fork is operated on said bar, using it as a fulcrum, and owing to the raised angular position of the sheet B this main fork can be readily inserted underneath the sheet in the manner shown, without in any way scratching or injuring the sheet. The engagement with the sheet of the auxiliary fork is limited to the extreme edge portion thereof, which is trimmed or cut off in finishing the sheet, so that any scratching which may occur at this edge is wholly immaterial. The prongs on the auxiliary fork 10 are preferably far enough apart to permit the main fork 9 to work between them. Forks of other kinds or tools other than forks may be employed in carrying out my process.

The advantages of my invention will be apparent to those skilled in the art, since it provides a simple method whereby scratching of the glass is almost entirely eliminated without any material increase in the expense of operation. Furthermore, my invention does away with the necessity for highly skilled labor, and a boy or other unskilled attendant can be taught to manipulate the forks in a very short time.

What I claim is:—

1. The herein described method of removing glass sheets from flattening tables or stones, which consists in first introducing a prying tool under one edge portion only of the sheet and engaging the sheet at separated points, prying the sheet loose from the stone and upwardly into angular position with said tool, and then introducing lifting means underneath the sheet while still supported on the prying tool and between its points of support thereon, substantially as described.

2. The herein described method of removing glass sheets from flattening tables, which consists in introducing an auxiliary fork underneath the extreme edge portion only of the sheet, and prying the sheet from the table and upwardly into an angular position, and then introducing a main fork underneath the sheet; substantially as described.

In testimony whereof, I have hereunto set my hand.

ORLANDO BARTON CARNAHAN.

Witnesses:
 OCTAVE JACQMAIN,
 J. C. JOHNSON.